United States Patent

[11] 3,575,320

| [72] | Inventors | Samuel Prussin<br>Los Angeles;<br>Jimmie L. Mason, Hacienda Heights, Calif. |
|---|---|---|
| [21] | Appl. No. | 784,452 |
| [22] | Filed | Dec. 17, 1968 |
| [45] | Patented | Apr. 20, 1971 |
| [73] | Assignee | Dart Industries, Inc. |

[54] SEQUENTIAL VALVE
4 Claims, 7 Drawing Figs.

[52] U.S. Cl. ............................................. 222/144.5,
222/402.18
[51] Int. Cl. .................................................... B65d 47/26,
B65d 83/06
[50] Field of Search .................................... 222/144.5,
402.17, 402.18, 402.24, 148, 402.1

[56] References Cited
UNITED STATES PATENTS
3,217,936  11/1965  Abplanalp ................. 222/402.18X 3,283,962  11/1966  Whitmore .................. 222/402.18
3,341,082  9/1967  Meshberg .................. 222/402.18X

*Primary Examiner*—Raphael H. Schwartz
*Attorney*—Harold R. Beck

ABSTRACT: A sequential valve having a housing and a valve means reciprocally mounted therein, said valve means being cooperable with three spaced-apart valve elements in said housing such that said valve means may be forced into open position sequentially with respect to said spaced valve elements in order that one fluid may flow around one of said valve elements after another fluid is shut off with respect to flow around another of said valve elements to thereby provide for purging of said valve at the end of each operating cycle thereof, and wherein one of said valve elements is operable to prevent the purging fluid from passing through the valve during a time when products such as paint, or the like, are being dispensed through the valve.

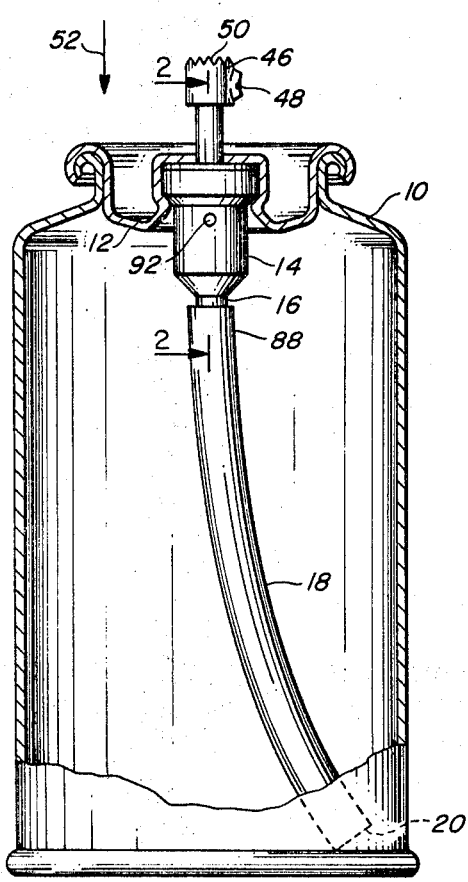
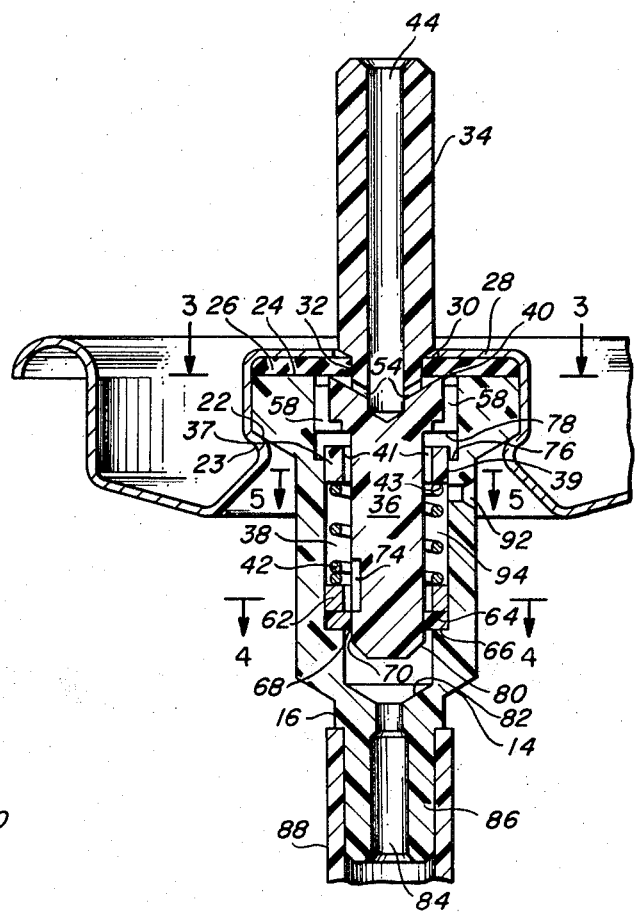
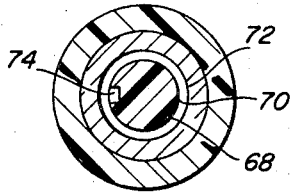
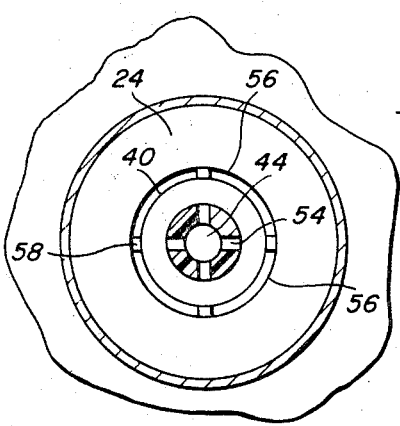
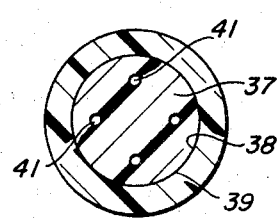

3,575,320

SEQUENTIAL VALVE

BACKGROUND OF THE INVENTION

Fluids-dispensing valves have been used for a great variety of fluids-dispensing purposes, and, particularly, aerosol fluids-dispensing valves are subject to malfunctions due to the collection of residues therein. Such residues may collect in valve chambers and dispensing nozzles of such valves which may be used specifically to dispense products such as antiperspirant sprays, starches and paint sprays, or the like. The collection of such residue causes clogging of the respective valve, thereby preventing proper dispensation of the contents from the containers holding materials in communication with such valve.

It has been heretofore possible to purge various prior art valves with vaporous fluids after each operating cycle thereof, however, it has been found that many of the aerosol vapors when entrained in material such as paint sprays or the like, causes undesirable effects. Accordingly, there has been a requirement for a compact, simple and economical automatically purging and self-cleaning valve having a minimum of moving parts and which will operate to prevent the collection of undesirable residues in the valve housing and attendant dispensing nozzle structures and, further, substantially to prevent the mixing of purging fluid with material such as paint sprays, or the like.

SUMMARY OF THE INVENTION

The present invention relates to a novel sequentially operable fluids-dispensing valve having a housing and valve means reciprocally mounted therein. The housing and valve means are provided with cooperable valve elements adapted to operate in sequence to control the flow of a plurality of fluids therethrough such that the fluids pass through a common chamber and dispensing nozzle. The valve means of the invention is operable to cause sequential opening of the valve elements communicating with said plurality of fluids in such a manner that, on closing of the valve elements, one of the fluids is first shut off and another of the fluids may continue to pass through the valve for a short period of time during which said last-mentioned fluid purges the housing chamber of the valve, and also the dispensing nozzle thereof. This mode of operation occurs at the end of each fluid-dispensing cycle.

Specifically, the sequential valve of the invention comprises three sets of valve elements sequentially operable to provide for individual dispensation of vapor through the valve for purging it and individual dispensation of products such as paint, or the like, without vapor mixed therewith so as to prevent undesirable effects on the products being dispensed by entrainment of the aerosol vapor therein.

The foregoing functions are accomplished by novel valve means of the invention wherein three spaced-apart valve elements of a one-piece valve means are cooperable with respective spaced-apart valve elements carried in a housing wherein said valve means is reciprocally mounted. Actuation of the valve means a slight distance causes slight opening of the valve elements communicating with a first fluid source, whereupon further actuation of the valve causes closing off the first fluid source, and whereby further progressive movement of the valve means causes opening of the valve elements communicating with a second fluid source such as paint, or the like, so that the paint may be sprayed individually from the nozzle of the valve means, and whereby, during closing movement of the valve means in the valve housing, valve elements first shut off the second source of fluid and then open the first source of fluid to allow purging vapor to clear the interior of the valve chamber and nozzle preliminary to closing of third valve elements so that fluid from the first source continues to flow just preliminary to the final closing motion of the third valve elements to thereby purge the valve housing chamber and fluids-dispensing nozzle and clear the structure of the valve so that material such as paint sprays, or the like, do not accumulate therein and cause a clogged condition thereof.

The mechanism of the present invention is particularly simple and reliable due to a one-piece valve means which is reciprocally movable in a housing wherein three spaced valve elements are disposed and three cooperable-spaced valve elements are carried by a one-piece valve means, the valve elements carried by the one-piece valve means being spaced from each other and with respect to the elements in the housing so as to provide sequential opening of the respective valve elements in communication with separate fluids in such a manner as to provide for individual dispensation of paint sprays, or the like, from the valve and subsequent shutoff of flow paint sprays, or the like, whereupon other of the valve elements sequentially open before the valve is completely closed to permit purging fluid to pass through the valve and to purge it and clean it to prevent the accumulation of material such as paint, or the like, therein.

The simple construction of the invention includes a dispensing nozzle forming an integral portion of a one-piece valve means and the one-piece valve means in reciprocally mounted in a rectilinearly movable manner in order to actuate the valve elements of the invention for sequentially dispensing a plurality of fluids and for automatic purging of the valve during closing movement thereof at the end of each fluid-dispensing operation thereof.

Accordingly, it is an object of the present invention to provide a very simple and economical self-purging and -cleaning sequential valve particularly adapted for use in dispensing various aerosol products such as paint, whereby the paint may be dispensed individually and the purging fluid may be used to sequentially clean the valve at the end of each operating cycle after the dispensation of a paint or other similar products has been stopped from flowing through the valve.

Another object of the invention is to provide a very simple, economical and compact fluids-dispensing valve which is particularly adapted for use in connection with expendable aerosol fluids-dispensing containers.

Another object of the invention is to provide a very novel and simple valve mechanism, wherein a series of three valve elements are operable by single reciprocating valve member for the purpose of dispensing aerosol products and purging fluids individually.

Another object of the invention is to provide a very reliable and simple self-cleaning and nonclogging fluids-dispensing valve which is adapted to purge itself at the end of each cycle of operation and which is particularly adapted to dispense products such as antiperspirant sprays, starches and paint sprays, or the like.

Further objects and advantages of the invention may be apparent from the following specification, appended claims and accompanying drawings:

BRIEF DESCRIPTION OF THE DRAWINGS

FIG. 1 is a side elevational view of an aerosol container and cap structure showing a sequential valve of the present invention connected to the cap structure of the container, and having a dip tube in connection therewith extending downwardly into the container, and showing portions of the container fragmentarily and in section to facilitate the illustration;

FIG. 2 is an enlarged fragmentary sectional view taken from the line 2—2 of FIG. 1;

FIG. 3 is an enlarged fragmentary plan sectional view taken from the line 3—3 of FIG. 2;

FIG. 4 is a plan sectional view taken from the line 4—4 of FIG. 2;

FIG. 5 is a plan sectional view taken from the line 5—5 of FIG. 2;

DESCRIPTION OF THE PREFERRED EMBODIMENTS

Figure 6:
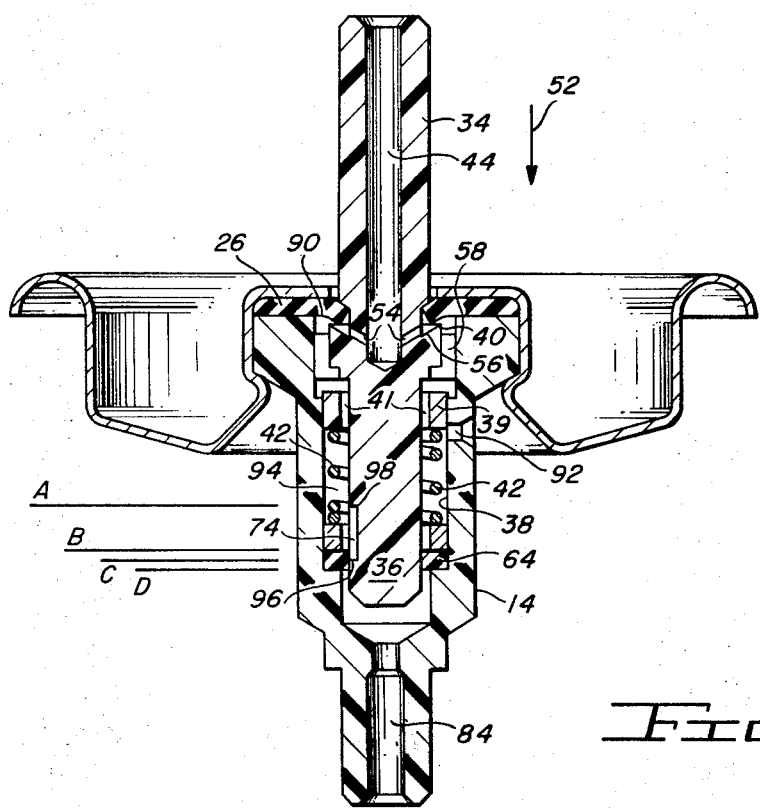
FIG. 6 is a view similar to FIG. 2, but showing a partially open position of the valve means of the invention relative to its respective housing, whereby the valve elements communicating with only one source of fluid may pass through the chamber and dispenser nozzle of the invention.

As shown in FIG. 1 of the drawings, an aerosol container 10 is of substantially conventional construction and is provided with a cap 12 supporting a valve housing 14 of the invention. A normally lower portion 16 of the housing 14 supports a dip tube 18 which has an open end 20 disposed in the normally lower end of the container 10.

The container 10 is adapted to contain aerosol products, such as antiperspirant sprays, starches and paints sprays, or the like, but may contain a great variety of materials, as desired.

The container 10 holds a paint or other materials with a pressurizing fluid therein, such that the pressurizing fluid will drive the liquid materials up the dip tube 18, and also provide a purging vapor under pressure above the liquid level in the container 10, all as will be hereinafter described in detail.

Referring to FIG. 2 of the drawings, it will be seen that the valve housing 14 is provided with an annular shoulder structure 22 retained by an indented annular crimp portion 23 of the cap 12. This crimp portion 23 clamps an end 24 of the housing 14 against a flexible valve element 26, this element 26 being a rubberlike material, and abutted to an end 28 of the cap 12. This end 28 is provided with a central opening 30, and the valve element 26 is provided with a central opening 32 which surrounds a substantially annular in cross section valve-dispensing nozzle 34 which is an integral portion of a one-piece valve means 36. This one-piece valve means 36 is preferably made of plastic, and is reciprocally mounted concentrically in a bore portion 38 of the housing 14. The bore portion 38 has a substantially concentric longitudinal axis and the one-piece valve means 36 is reciprocally movable in the housing 14 along this central or longitudinal axis of the bore portion 38.

The one-piece valve means 36 is provided with an annular poppet valve portion 40 normally held in seated engagement with an inner side of the valve element 26 by means of a compression spring 42, as will be hereinafter described in detail.

The annular poppet valve portion 40 of the valve means 36 comprises a valve element which communicates with a passage 44 in the nozzle portion 34. Mounted on an outer end of the nozzle portion 34 and communicating with the passage 44 is a manually operable dispensing head 46 having a spray-emitting orifice 48 adapted to dispense aerosol products from the passage 44.

The head 46 is provided with a finger- or thumb-engaging area 50 adapted to provide a facility for manually applying pressure on the valve means 36 of the invention in a direction, as indicated by an arrow 52 in FIG. 1 of the drawings, so as to unseat the poppet valve 40 from the valve element 26 to a position as shown in FIG. 5, and progressively to a position as shown in FIG. 6, and as will be hereinafter described in detail.

Communicating with the passage 44 are substantially radial passages 54. These passages 54 extend through the sidewall of the hollow nozzle portion 34, and communicate with an inner side of the valve element 26 and with the annular poppet valve element 40 of the one-piece valve means 36.

It will be seen that the central opening 32 of the valve element 26 is sealingly engaged around a reduced diameter portion of the nozzle 34 so as to provide an efficient seal with respect to the nozzle portion 34 and to force fluids to pass through the passages 54 and 44 to the dispensing and actuating nozzle head 46.

The poppet valve portion 40, as shown in FIG. 2, is provided with an integral annular guide portion 56, slidably mounted in a bore portion 57 of the housing 14. The guide portion 56 is provided with notches 58 in the periphery thereof. These notches 58 are adapted to provide for the passage of fluid upwardly to the annular poppet valve element 40, as will be hereinafter described in detail.

The spring 42, at its upper end, is shouldered against a slide valve element 37 on the one-piece valve means 36. A lower end of the spring 42 is shouldered on a substantially rigid ring 62 which engages a compressible or elastic valve element 64 supported on a shoulder 66 in the housing 14. The valve element 64 is provided with a central opening 68 intimately and sealingly engaging a respective peripheral portion 70 of the one-piece valve member 36.

The ring 62 is provided with a bore portion 72 which is substantially larger than the periphery of the portion 70 of the one-piece valve element 36 to allow for the passage of fluid between the bore 72 and the peripheral portion 70 of the valve means 36.

The valve means 36 is provided with a slot 74 in the side sidewall of the portion 70. This slot is axially elongated in a direction parallel to the longitudinal axis of the bore 38, and the slot 74 is substantially longer than the axial length of the seal 64 so as to extend above and below the seal 64 in order to bypass fluid therearound, as will be hereinafter described, in connection with the disclosure of FIGS. 5 and 6 of the drawings.

A stop shoulder 76 in the housing 14 is engageable by a lower portion 78 of the guide portion 56 of the one-piece valve means 36. This stop portion 76, when engaged by the end portion 78 of the guide means 56, disposes a normally lower end 80 of the one-piece valve member in slightly spaced relationship with an end 82 of the bore portion of the housing 14 so as to permit the passage of fluid around the end 80. The end portion 82 of the bore portion in the housing 14 communicates with a passage 84 surrounded by an annular dip tube neck wall 86 which is integral with the housing 14. This neck wall 86 is surrounded by a portion 88 of the dip tube 18.

The one-piece valve means 36 is provided with an annular radially projecting valve element 37 having a normally lower edge 43 normally disposed at an upper portion of a port 92, in the sidewall of the housing 14, when the one-piece valve means 36 is in the closed position, as shown in FIG. 2 of the drawings. The port 92 communicates with aerosol vapor above the liquid level in the container 10. The valve element 37 is provided with a peripheral portion 39 closely conforming with the bore 38 so that it acts as a slide valve with respect to the position of the port 92.

This slide valve element 37 is adapted to start closing the port 92 after the poppet valve 40 has been moved to slightly open position, so that, initially, with the opening of the poppet valve 40, vapor passes through the port 92 and through the valve chamber to purge it.

The valve element 37, as shown in FIG. 5 of the drawings, is provided with a plurality of ports 41 through which fluid may pass from the chamber 94 and upwardly through the slots 58 as hereinbefore described.

The longitudinal length of the valve element 37 is substantially greater than the stroke of the valve when the valve moves from the stop portion 78 to the stop portion 76 of the one-piece valve means 36 and the housing 14, respectively.

Referring to FIG. 6 of the drawings, it will be seen that, when the valve means 36 of the invention is forced in a direction of an arrow 52, the poppet valve element 40 may be displaced relative to an inner surface 90 of the valve element 26. This permits, momentarily, the flow of aerosol fluid through the port 92 which is disposed in the sidewall of the housing 14, and this portion 92 is primarily adapted to admit vaporous fluid into a chamber 94 in the housing 14; this chamber communicates with the notches 58 in the valve guide 56, such that the vaporous fluid may flow upward through the ports 41 and notches 58 and ports 54 and outward through the dispenser passage 44 of the nozzle portion 34, as hereinbefore described.

This position of the valve means 36, as shown in FIG. 6, disposes a normally lower end 96 of the slot 74 of the valve means about midway of the axial length of the valve element 64 and approximately in the position of the line C, shown in FIG. 5 of the drawings, while the normally upper end 98 of the slot 74 is disposed substantially at the position of the line A, shown in FIG. 6 of the drawings, while normally upper and lower axial ends of the valve 64 are located at the lines B and D, respectively.

In this position, no fluid is allowed to flow up the dip tube 18 and through the passage 84, and in this position, only vaporous fluid is adapted or permitted to flow through the passage or port 92, as hereinbefore described.

This is the purging position of the valve of the invention. Normally the materials that tend to clog the valve pass up through the dip tube 18, these materials being those such as paint, or other similar materials, hereinbefore described.

The position of the valve means 36, as shown in FIG. 6, represents an initial opening position or a position the valve assumes just prior to closing and during the purging operation of the valve.

The spring 42 at all times urges the valve means 36 toward a closed position, as shown in FIG. 2.

Figure 7:
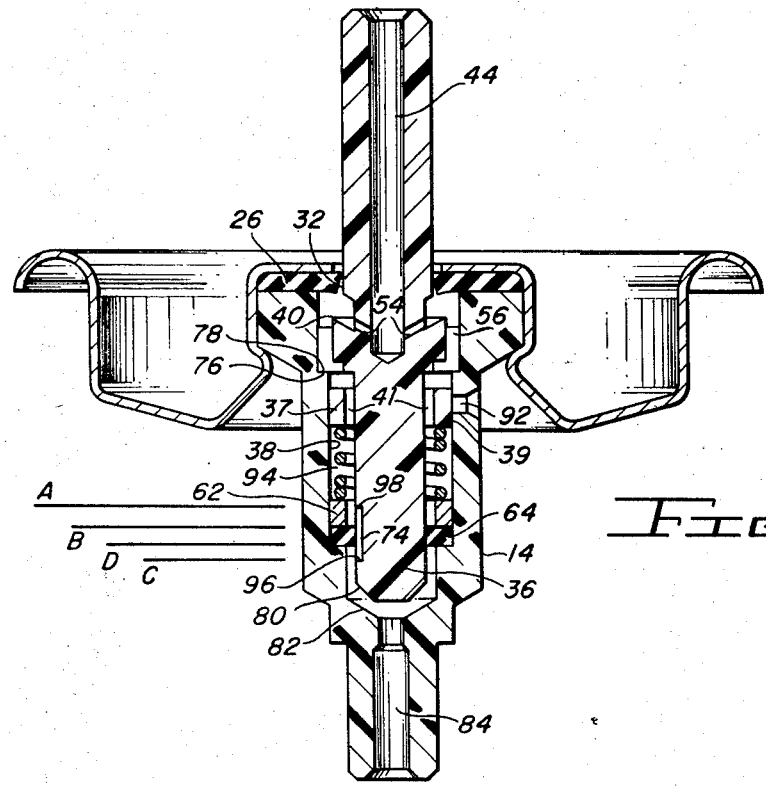
FIG. 7 is a view similar to FIGS. 2 and 6, and showing the valve means of the invention moved relative to the respective valve housing to a fully open position wherein only one product such as paint, may be dispensed through the valve, and showing a source of aerosol vapor shut off with respect to valve elements controlling its flow through the valve housing of the invention.

When the valve means 36 of the invention is disposed in the position, as shown in FIG. 7 of the drawings, the poppet valve element 40 is fully displaced from the valve element 26, and the valve element 26, at its central opening 32, is deflected downwardly to a considerable degree due to the fact that the relatively enlarged portion of the stem 34 has passed into the opening 32, and thereby formed a very tight seal, as hereinbefore described.

When the stop or end portion 78 of the guide portion 56 of the one-piece valve element 36 has engaged the stop shoulder 76 in the bore of the valve housing 14, as shown in FIG. 7 of the drawings, the end 80 of the valve means 36 is spaced from the end 82 of the valve housing bore to allow liquid fluids to pass upwardly through the passage 84, and in this position the slot 74 has its lower end 96 disposed below the valve element 64 and the upper end 98 of the slot 74 is disposed above the valve element 64 so that liquid fluid may pass through the slot 74 and through the bore 72 of the ring 62, and upwardly into the chamber 94. The liquid, such as paint or the like passes from the chamber 94 and upwardly through the ports 41 and the notches 58 in the guide 56, around the poppet valve element 40, and through the ports 54 and nozzle outlet passage 44.

It will be seen that the notches 58 each extend downwardly below the poppet valve element 40 sufficiently to provide a substantially L-shaped passageway. These slots 58, as shown in FIG. 2, overlie the shoulder 76 sufficiently to provide open passages around the head structure of the valve means 36 which forms the poppet valve element 40.

It will be seen that when the valve element 37 is moved downward to a position as shown in FIG. 7, the slide valve element 37 fully covers the port 92 and prevents the flow of vaporous material therethrough and into the chamber 94 so that only paint or other material passing through the slot 74 is permitted to pass through the valve and outwardly through the nozzle 44.

It has been found that when the aerosol vapor passes out through the nozzle 44 with the paint that it has an undesirable effect on the paint, and therefore during the dispensation of paint or other materials through the slot 74 the port 92 is closed by the valve element 37. Thus, the one-piece valve means 36 comprises the poppet valve 40, the slide valve element 36 and the slot 74, all of which cooperate respectively with the seal member 26, the port 92, and the resilient valve element 64, hereinbefore described.

It will be seen that the flow of liquid thus passes through the slot 74 around the valve element 64, and that when the one-piece valve means 36 is moved toward closed position, it takes the position as shown in FIG. 6, wherein the normally lower end 96 of the slot 74 has passed into the bore or central sealing opening of the valve element 64, and thereby shuts off flow of liquid fluid from the passage 84. At this time, only vaporous fluid passing through the port 92 enters the chamber 94 of the valve housing 14, and thereby purges the liquid materials from the chamber, and also purges the liquid materials from the area around the poppet valve 40, the valve element 26, ports 54 and the passage 44, as well as the dispensing orifice 48 of the nozzle-actuating head 46. Thus, preliminary to the engagement of the poppet valve element 40 with the elastic valve element 26, the sequential valve of the invention is purged by the passage of the vapor fluid therethrough.

The spacing of the valve elements 26, port 92, and valve element 64 in the housing 14 are different than the spacing of the valve elements 40, 37 and 74 carried by the one-piece valve means 36, to afford extremely simple sequential valve operation of the invention.

The simple construction and operation of the valve of the invention will be appreciated in accordance with the minimum of parts and the simple valve elements, as hereinbefore described.

It will be obvious to those skilled in the art that various modifications of the present invention may be resorted to without departing from the spirit of the invention.

I claim:

1. In an aerosol products-dispensing valve, a valve housing adapted to be coupled to an aerosol container; said housing provided with a bore therein having a longitudinal axis; a valve member movably mounted in said bore and reciprocable along said axis; resilient means tending to force said valve member in one direction toward a closed position; said housing having first, second and third valve elements therein, all spaced-apart longitudinally along said axis; said valve member having separate longitudinally spaced first, second and third valve elements respective to and cooperable with said first, second and third valve elements in said housing; said first valve elements of said member and said housing adapted to communicate with and disposed to control the flow of a liquid product through said dispensing valve; said second valve elements of said member and said housing adapted to communicate with and disposed to control the flow of a vapor through said dispensing valve; said third valve elements of said member and said housing disposed and communicating with the outlets of said first and second valve elements; said third valve elements disposed at the outlet of said housing and acting as a main dispensing valve structure; said second valve elements being disposed in open position when said first and third elements are in closed position; said second valve elements being disposed to be in closed position when said first and third valve elements are in open position, whereby a product may be dispensed through said first valve elements while a vaporous product is shut off relative to said second valve elements so that a liquid product flowing through said first valve elements may also flow individually through said third valve elements and be dispensed to a location outside an aerosol container, and whereby upon closing of said first valve elements, vapor may flow through said second valve elements preliminary to closing of said third valve elements to purge said dispensing valve of liquid products previously dispensed through said first valve elements and said third valve elements.

2. The invention, as defined in claim 1, wherein said first valve elements and said second valve elements are slide valves and said third valve element of said valve member is a poppet valve.

3. The invention, as defined in claim 2, wherein: said first valve element in said housing comprises a resilient ring having a bore through which said valve member slides; said valve member having a slot in the periphery thereof adjacent to said bore, said slot being longer than the axial length of said resilient ring, whereby fluid may flow through said slot from one side of said ring to the opposite side thereof; said second valve element on said valve member being an annular member slidable in close proximity to the bore in said housing; said second valve element in said housing being a port extending through the sidewall thereof and adapted to communicate with said vapor; said valve member having an enlarged diameter portion forming said poppet valve element; and a resilient gasket means secured in connection with the end of said housing against which said poppet valve element seats; said poppet valve element having an integral hollow stem extending outwardly relative to said housing and said resilient seal; and ports extending from the interior of said hollow stem outwardly adjacent to the side of said poppet valve element seated against said resilient seal.

4. The invention, as defined in claim 3, wherein: said annular slide valve element on said valve member is open relative to said port, when said poppet valve member is closed against said resilient seal gasket means and said first valve element, carried by said valve member being said slot, is disposed at one side of said resilient ring in a shutoff position relative to said liquid product, whereby slight opening of said poppet valve allows fluid to flow through said port and outwardly through said hollow nozzle, and whereupon further opening movement of said valve member in a direction to further opening said poppet, causes said second valve element of said valve member to close said port, whereupon slightly further movement of said valve member in said bore of said housing causes opposite ends of said slot to be disposed at opposite sides of said resilient seal ring of said first valve element in said housing, whereby said vapor is shut off from flowing through said port when a liquid product is allowed to flow through said slot of said first valve element of said valve member.